June 24, 1941.   A. M. LEVEY   2,247,128
BOAT AND LUGGAGE CARRIER
Filed Sept. 14, 1939   3 Sheets-Sheet 2
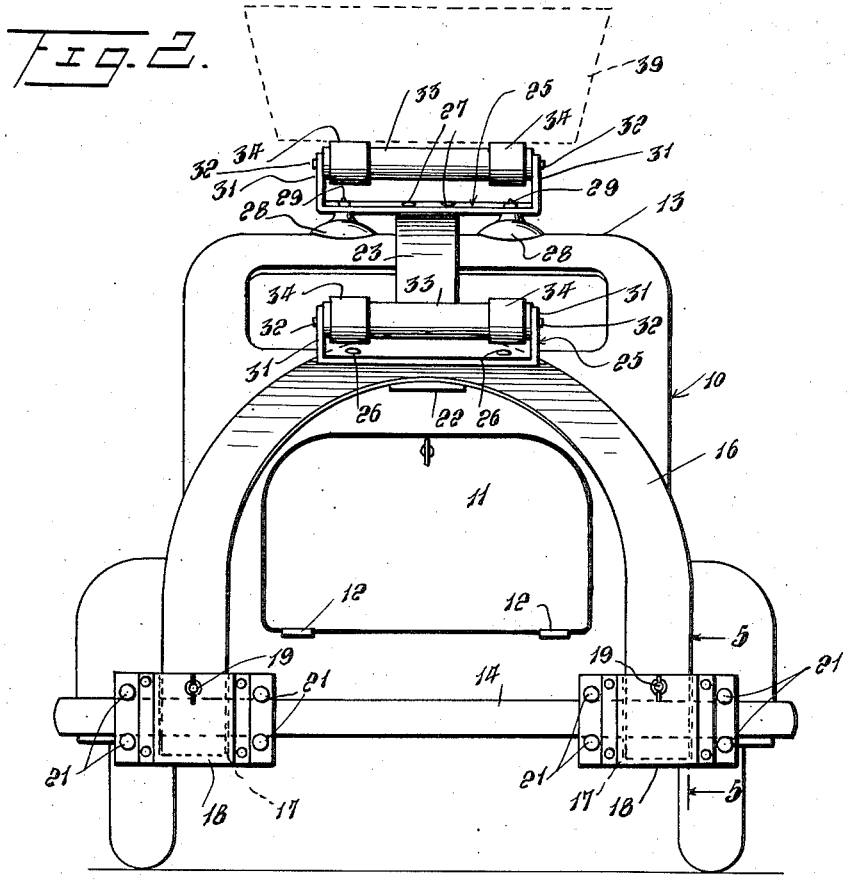
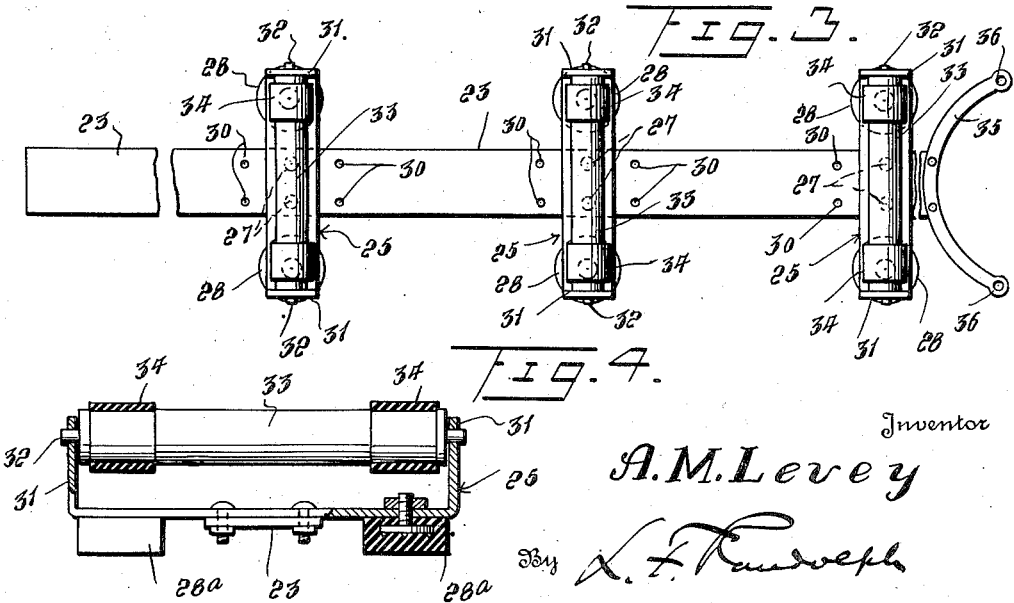
Inventor
A. M. Levey
By L. F. Randolph
Attorney

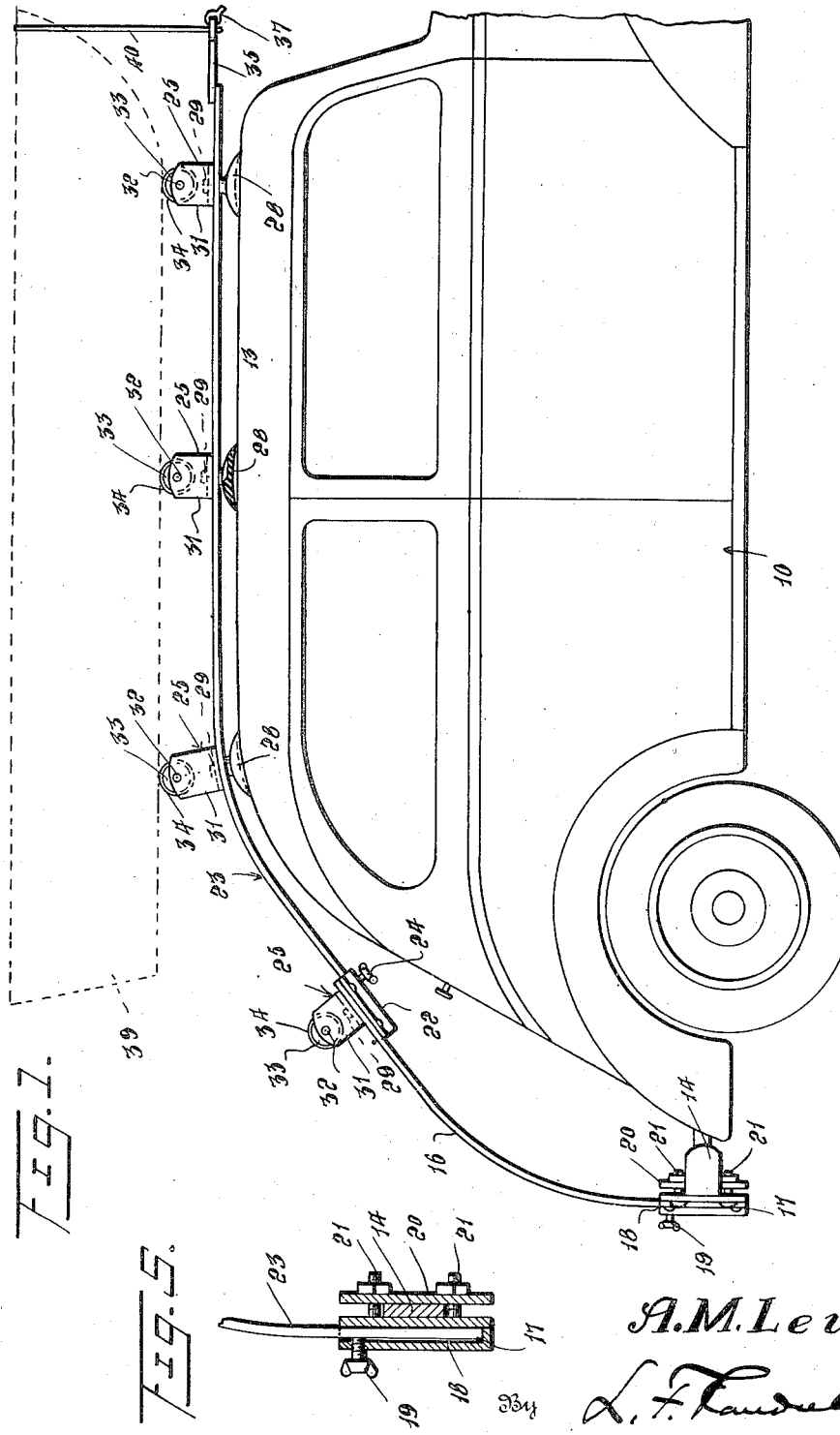

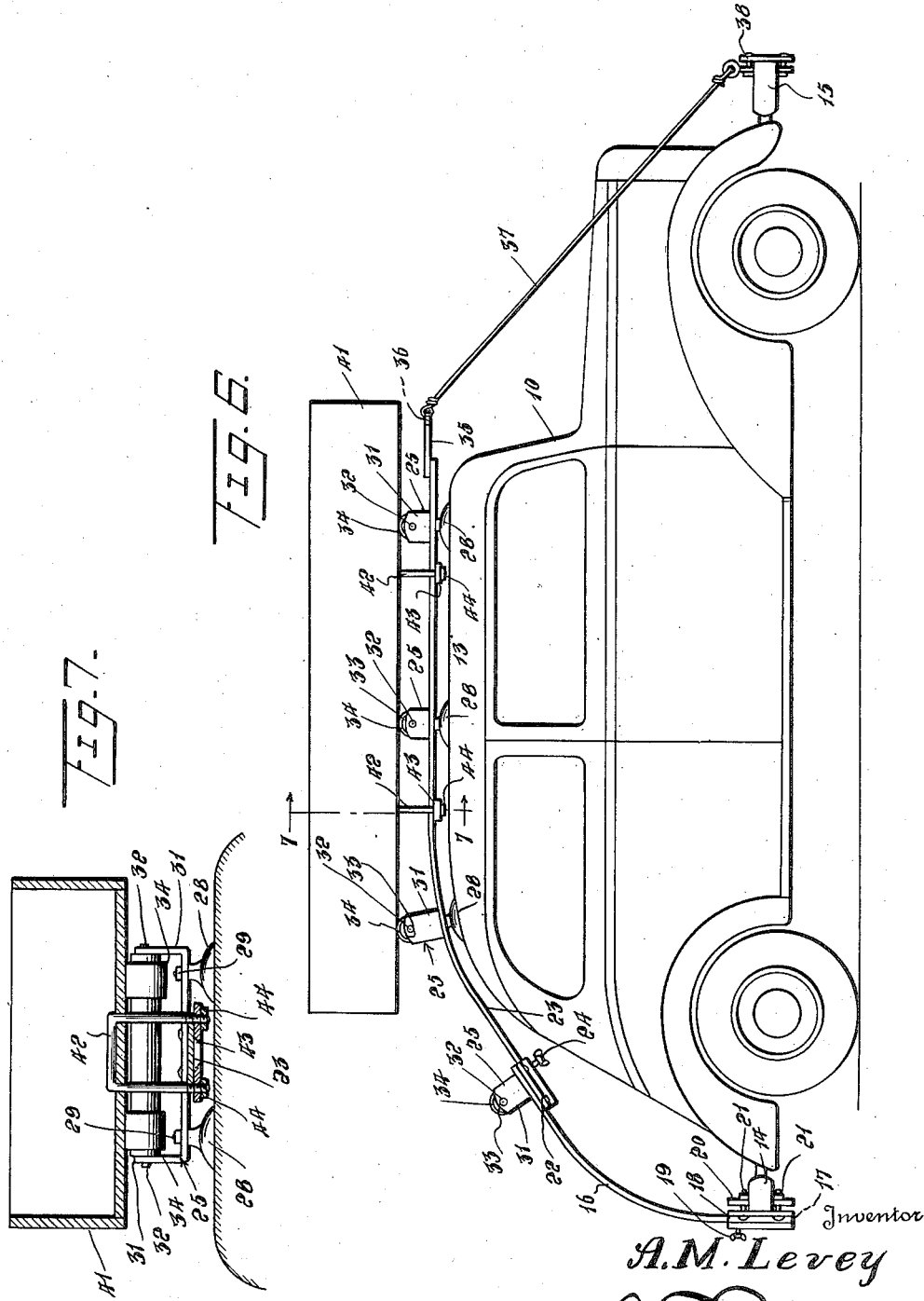

Patented June 24, 1941

2,247,128

UNITED STATES PATENT OFFICE 2,247,128

BOAT AND LUGGAGE CARRIER

Alvin M. Levey, Pine Bluff, Ark.

Application September 14, 1939, Serial No. 294,963

4 Claims. (Cl. 224—29)

This invention relates to a carrier primarily used as an attachment for automobiles or the like for use in carrying boats and other luggage.

It is particularly aimed to avoid the necessity of employing a trailer and the incident expense and disadvantages, in transporting a boat or other luggage, being less of a hazard to adjacent traffic and being more economical.

More specifically, it is aimed to provide a novel means having a bracket, preferably of arch shape enabling access to the luggage space in the rear of an automobile, to which a track and supporting member is attachable, the latter having vacuum cups or cushion means to engage the top of the automobile and also having roller means to facilitate the loading of the ship or other luggage and the unloading thereof.

The more specific objects and advantages will become apparent from a consideration of the description following taken in connection with accompanying drawings illustrating an operative embodiment.

In said drawings:

Figure 1 is a view fragmentarily showing an automobile in side elevation, with my improvements applied thereto and with a boat suggested in dotted lines as carried thereby;

Figure 2 is a rear elevation of the parts of Figure 1;

Figure 3 is a plan view of the track and supporting section;

Figure 4 is a cross sectional view through a modified form of such track and supporting section;

Figure 5 is a vertical sectional view taken on the line 5—5 of Figure 2;

Figure 6 is a view similar to Figure 1 showing a body or receptacle mounted by the attachment to carry luggage generally, and Figure 7 is a vertical sectional view on the line 7—7 of Figure 6.

Referring specifically to the drawings wherein like reference characters designate like or similar parts, 10 designates a conventional automobile having a rear luggage compartment accessible through the opening of a door 11 hinged in place on a horizontal axis at 12. The roof or top wall of the body of the automobile is shown at 13. A rear bumper is shown at 14 while a front bumper is shown at 15.

A U-shaped or arched frame or bracket is employed at 16 as part of my invention, and its free ends are detachably mounted within sockets 17 of brackets 18 in which they may be held by a binding screw 19, carried by one or both brackets. Such brackets 18 are detachably clamped to the rear bumper 14 by means of plates 20 and bolts 21 passed through the brackets 18 and plates 20.

Particular attention is called to the fact that the frame 16 is of such size and shape that it affords ample space and clearance for opening and closing the door 11 and hence does not interfere with access to the luggage compartment of the automobile.

Said frame 16 preferably is curved upwardly and forwardly. On the undersurface of the frame 16, centrally thereof at the top, is a pocket member 22 into which the rear end of a track section 23 is removably slidable and clamped in place by a binding screw 24.

Said track and supporting member 23 is metallic and may be made of a material which is readily bendable according to the contour of the top of the automobile and to maintain such shape.

At suitable intervals U-shaped mountings 25 are provided one being riveted as at 26 to the frame 16 and the others being bolted or riveted as at 27 to the track member 23. Those mountings 25 fastened to the track member 23, on opposite sides of the latter, have rubber or other cushioning elements 28 bolted or otherwise fastened thereto at 29 so as to directly engage the top wall or roof 13 of the automobile. Such elements 28 are preferably vacuum cups as best shown in Figure 1. On the other hand, they may be rubber blocks 28a as suggested in Figure 4. The mountings 25 are adjustable to different positions on the track member 23 since the bolts 27 are applicable to selected openings of series 30.

All of the mounting members 25 have upright ears 31 in which the trunnions 32 of transverse rollers 33 are journaled. It is obvious that roller bearings, ball bearings or any equivalent for the trunnions 32 may be used. Resilient rubber bands 34 may surround the rollers 33 adjacent their ends.

A bar 35 is fastened to the forward end of the track member 23 and has openings 36 in the opposite ends thereof so that cables 37 may be fastened to the bar 35 and also fastened to conventional clamps or other means 38, carried for instance by the front bumper 15 of the automobile.

As shown in Figures 1 and 2, a boat 39 may be supported by the uppermost rollers 23, with the engagement cushioned by the interposed rubber bands 34. It is clear that the boat is first engaged with the rearmost roller and then progressively tilted and moved forwardly into the position of Figure 1, the parts being such that this may be accomplished by one man. In addition, one or more ropes or cables 40 are attached to any suitable part of the boat and their other ends are fastened in the openings 36, the boat thus being secured in place against accidental displacement.

In addition to being able to carry a boat as in Figures 1 and 2, luggage generally may be carried by the improvements. For instance, as shown in Figure 6, a body or receptacle 41 may be engaged with the uppermost rollers in the same manner as outlined with respect to the boat 39. Such receptacle however has attached thereto a pair of U-shaped brackets 42 whose legs extend below the track member 23 on opposite sides of the latter, passing through a plate 43 below the latter and receiving nuts 44 to clamp the parts in place. Any desired luggage may be carried within the receptacle 41.

Either or both the frame 16 and the track and supporting section 23 may be left in place on the automobile or removed as preferred. Ordinarily, the frame 16 is left in place with the section 23 removed, because the frame does not interfere with access to the luggage space of the car.

Various changes may be resorted to provided they fall within the spirit and scope of the invention.

I claim as my invention:

1. In combination with a vehicle having a top, a track member exteriorly supported on said top, roller means on said track member at different distances above the upper surface thereof facilitating the loading of luggage, said track member being bendable to conform to the shape of said top, a frame at the rear of the vehicle extending upwardly and forwardly, clamp means between the track and frame, a roller carried by the frame at a lower level than the first mentioned rollers, said frame being generally of U-shape and located at the rear of the vehicle with its legs lowermost and at opposite sides of the vehicle.

2. In combination with a vehicle having a top, a track member exteriorly supported on said top, roller means on said track member facilitating the loading of luggage, a frame at the rear of the car extending upwardly and forwardly, clamp means between the track and frame, a roller carried by the frame at a lower level than the first mentioned rollers, said frame being generally of U-shape and located at the rear of the vehicle with its legs lowermost and at opposite sides of the vehicle said vehicle having a bumper, brackets on the bumper providing pockets detachably engaged by the terminal ends of the frame.

3. In combination with a vehicle having a top, a track member exteriorly supported on said top, roller means on said track member facilitating the loading of luggage, a frame at the rear of the car extending upwardly and forwardly, clamp means between the track and frame, a roller carried by the frame at a lower level than the first mentioned rollers, said frame being generally of U-shape and located at the rear of the vehicle with its legs lowermost and at opposite sides of the vehicle, said vehicle having a bumper, brackets on the bumper providing pockets detachably engaged by the terminal ends of the frame, a bar adjacent the forward end of the track, and means fastening said bar to the body.

4. In combination with a vehicle having a top, a track member exteriorly supported on said top, roller means on said track member facilitating the loading of luggage, a frame at the rear of the car extending upwardly and forwardly, clamp means between the track and frame, a roller carried by the frame at a lower level than the first mentioned rollers, said frame being generally of U-shape and located at the rear of the vehicle with its legs lowermost and at opposite sides of the vehicle, said vehicle having a bumper, brackets on the bumper providing pockets detachably engaged by the terminal ends of the frame, a bar adjacent the forward end of the track, means fastening said bar to the body, a receptacle engaging the uppermost rollers, and clamp means extending from the receptacle detachably engaging the track member.

ALVIN M. LEVEY.